United States Patent
Steplewski et al.

(10) Patent No.: US 7,278,828 B2
(45) Date of Patent: Oct. 9, 2007

(54) REPAIR METHOD FOR PLENUM COVER IN A GAS TURBINE ENGINE

(75) Inventors: Marek M. Steplewski, Mission, TX (US); Luciana de Fatima Lira Dederichs, Bingen-Petropolis (BR)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/224,655

(22) Filed: Sep. 12, 2005

(65) Prior Publication Data

US 2006/0257244 A1    Nov. 16, 2006

Related U.S. Application Data

(60) Provisional application No. 60/612,230, filed on Sep. 22, 2004.

(51) Int. Cl.
F03B 11/00 (2006.01)

(52) U.S. Cl. ............. 416/97 R; 415/115; 29/888.024

(58) Field of Classification Search .......... 29/888.024, 29/888.025; 415/115; 416/97 R
See application file for complete search history.

(56) References Cited

U.S. PATENT DOCUMENTS

| | | | |
|---|---|---|---|
| 3,275,294 A * | 9/1966 | Allen et al. ................. 415/115 |
| 3,732,031 A * | 5/1973 | Bowling et al. .......... 416/97 R |
| 4,176,433 A | 12/1979 | Lee et al. |
| 4,214,355 A | 7/1980 | Zelahy |
| 4,305,697 A | 12/1981 | Cohen et al. |
| 4,321,009 A | 3/1982 | Fujii et al. |
| 4,953,777 A | 9/1990 | Griffith et al. |
| 5,224,818 A * | 7/1993 | Drerup et al. .............. 415/115 |
| 5,392,513 A | 2/1995 | Mazzola et al. |
| 5,634,766 A | 6/1997 | Cunha et al. |
| 5,895,205 A | 4/1999 | Werner et al. |
| 5,993,150 A * | 11/1999 | Liotta et al. ................. 415/115 |
| 6,056,507 A | 5/2000 | Wheat et al. |
| 6,343,911 B1 | 2/2002 | Burdgick |
| 6,382,906 B1 | 5/2002 | Brassfield et al. |
| 6,398,485 B1 * | 6/2002 | Frosini et al. .............. 415/115 |
| 6,477,773 B1 | 11/2002 | Wilson et al. |
| 6,596,957 B2 | 7/2003 | Gandy et al. |
| 6,929,445 B2 * | 8/2005 | Zatorski et al. ............. 415/115 |
| 2003/0094440 A1 | 5/2003 | Gandy et al. |

* cited by examiner

Primary Examiner—Igor Kershteyn
(74) Attorney, Agent, or Firm—McNees Wallace & Nurick LLC

(57) ABSTRACT

A gas turbine engine plenum cover is repaired using a prefabricated repair cover SPAD. The SPAD repair cover has a spoolie boss that is aligned and attached to the body of the repair plenum cover prior to attachment to a plenum casting to form a repaired plenum chamber. Preattachment of the spoolie boss by brazing methods, as well as optional machining of a borescope hole prior to or after attachment of the repair cover, greatly simplifies the repair process, thereby reducing the time required and cost of repair.

20 Claims, 4 Drawing Sheets

REPAIR METHOD FOR PLENUM COVER IN A GAS TURBINE ENGINE

CROSS REFERENCE TO RELATED APPLICATIONS

This application claims priority to U.S. Provisional Patent Application No. 60/612,230 filed Sep. 22, 2004, which application is hereby incorporated by reference.

FIELD OF THE INVENTION

The present invention relates generally to repair methods for gas turbine engines, and more particularly, to a method of replacing a damaged plenum cover using a multiple detail assembly.

BACKGROUND OF THE INVENTION

In a gas turbine engine, air is pressurized in a compressor and mixed with fuel in a combustor and ignited for generating hot combustion gasses which flow downstream through several turbine stages. A turbine stage includes stationary turbine vanes extending radially between inner and outer castings. The vanes are hollow with openings that mate to openings within the castings. The vanes have airfoil configurations for guiding the combustion gasses between corresponding turbine rotor blades disposed downstream of the vanes. The blades are mounted to the perimeter of a rotor disk that rotates during operation for providing power to turn the compressor or fan during operation.

Since the turbine vanes are heated during operation by the hot combustion gasses which flow thereover, cooling air bled from the compressor is channeled inside the vanes for cooling thereof. Typically, the cooling air flows toward the center of the turbine as the air passes through the vanes. In order to channel the cooling air through the vanes, the outer casing is fitted with a cover to create a plenum. The cover encases the compressed cooling air openings that mate with the vane openings. The cover has an opening to accommodate a spoolie boss which allows air to enter the plenum.

During normal operations, the cover may collapse due to engine cycling. This collapse is associated with cover distortion and elongation as well as spoolie boss distortion. While it is not known exactly why the plenum covers become distorted, it is believed that an adverse thermal gradient is responsible, with pressure changes possibly also an associated factor.

In order to repair the cover, a typical procedure involves removing the cover, installing a repair cover, and then attaching a spoolie boss to the cover. Additionally, if a borescope hole is desired, existing methods require machining the repair cover after installation. This method requires multiple repair steps which increase repair costs. What is needed is a method of repairing a plenum cover that requires fewer steps, lowers repair costs, and produces a repaired part that meets or exceeds OEM performance specifications.

SUMMARY OF THE INVENTION

The present invention is a novel method for repairing a plenum cover for a turbine engine including by fabricating a repair cover including attaching a spoolie boss to the cover to provide a one-piece spare-part detail (hereinafter "SPAD") for subsequent use as a plenum cover replacement.

The present invention provides a method of repairing a gas turbine plenum that includes fabricating a repair cover, wherein the repair cover is fabricated from a sheet metal with an attached spoolie boss, and wherein the spoolie boss is adapted to permit the passage of a cooling gas. The method further includes the step of removing an undesired cover from a vane assembly, wherein the undesired cover is adapted to direct the flow of cooling gas to at least one vane opening, positioning the repair cover in a desired alignment with the vane assembly, and attaching the repair cover to the plenum. The step of attaching preferably includes use a of a first mechanical means to initially secure the part, followed by use of a second means to permanently attach the repair cover to the vane assembly. Optionally, the methods further include providing a borescope hole in the repair cover during the step of fabrication.

Advantages of the methods and apparatus of the present invention include a substantial reduction in manufacturing and repair costs due to recycling of previously non-repairable used vane assemblies made possible by the present invention.

A corresponding advantage is an increase in the service life of the vane assemblies due to repair and re-use facilitated by the present invention.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
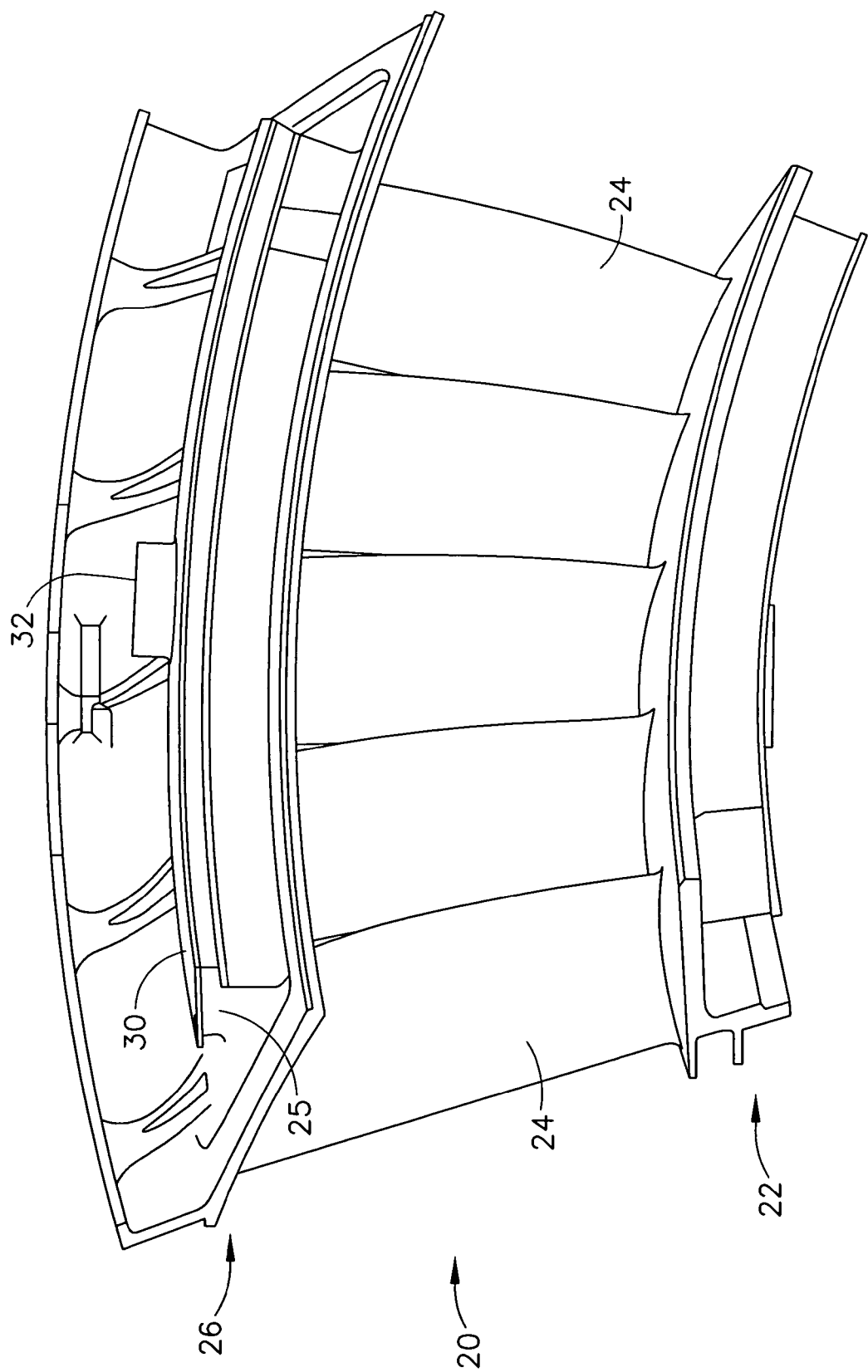
FIG. 1 is a side perspective view of an exemplary prior art nozzle and vane assembly for a gas turbine engine.

The present invention relates to the repair of low-pressure turbine (hereinafter "LPT") nozzle and vane assemblies used in stages of gas turbine engines. In particular, the invention provides manual methods of repair of the inner and outer plenum covers of a LPT nozzle and vane assembly.

Referring now to FIGS. 1-6, the methods of the present invention include providing a SPAD having a multiple detail assembly that includes a repair plenum cover 34 having an attached spoolie boss 32, the repair plenum cover 34 fabricated from a unitary sheet of material. In the repair method for a vane assembly 20 previously in service in a turbine engine, the nozzle and vane assembly 20 is first removed from the engine. The existing plenum cover 30 is then mechanically removed from the vane assembly to expose the plenum casting 25. Optionally, the plenum casting 25 is machined as necessary, such as by CNC machining, to receive and retain a repair outer plenum cover 34. Next, the repair plenum cover 34 is fabricated from sheet material and a spoolie boss 32 is attached using appropriate manual methods such as gas tungsten arc welding ("GTAW"), tack welding, and/or the like. The resulting SPAD is then alloyed to permanently attach the spoolie boss 32, and is then permanently secured to the plenum casting, preferably using a brazing process. Optionally, a borescope hole is machined into the SPAD, whether before or after attachment of the spoolie boss 32 to the repair plenum cover 34, as well as before or after the attachment of the SPAD to the plenum casting of the outer housing 26. Finally, the repaired nozzle and vane assembly is inspected and machined as necessary so as to provide a turbine vane assembly that is meets predetermined specifications. Where a borescope hole 33 is provided, the inspection may include a visual inspection of the interior plenum chamber 25 of the repaired vane assembly using tools known in the art, such as a borescope inserted into a borescope hole 33 to inspect the plenum chamber 28, the chamber formed by attachment of the repair cover 34 to the plenum casting 25.

Figure 2:
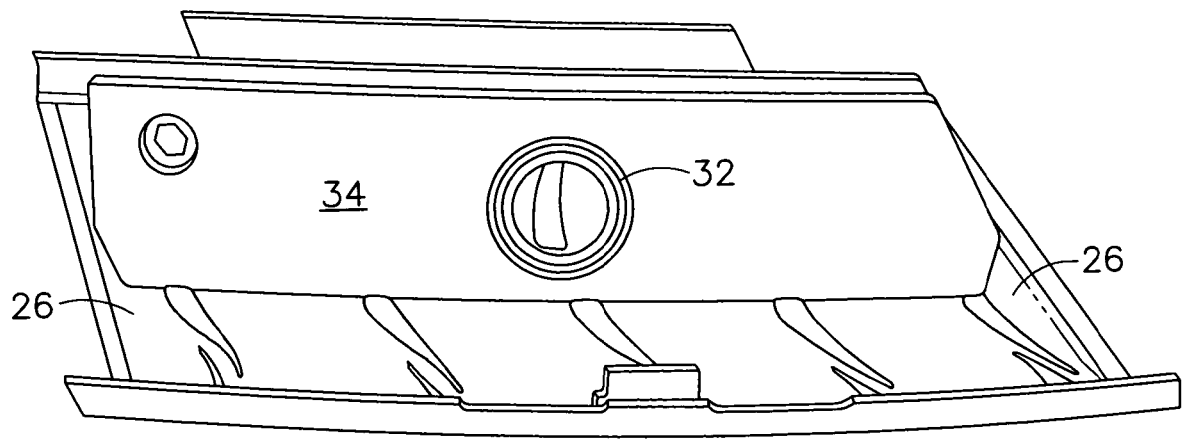
FIG. 2 illustrates a top perspective view of the prior art nozzle and vane assembly of FIG. 1, wherein a plenum cover of the assembly is damaged.

FIGS. 1-2 depict an exemplary nozzle and vane assembly 20 for a gas turbine aircraft engine (not shown). In these illustrations, vane assembly 20 includes an inner housing 22, a plurality of vanes 24, and an outer housing 26. Vane assembly 20 has an outer plenum cover 30 attached to the plenum casting 25 of the outer housing 26. In operation, vanes 24 are heated by hot compressed gasses and channel cooling air through channels (not shown) provided in the interior of the vanes 24 to permit cool, compressed air to cool the structure of vanes 24. This cool air is directed from the compressor (not shown) through at least one outer spoolie boss 32 provided in the plenum cover 30, and then to the channels in the vanes 24. A portion of the outer housing 26, such as the plenum casting 25, is adapted to receivably retain the outer plenum cover 30.

Figure 3:
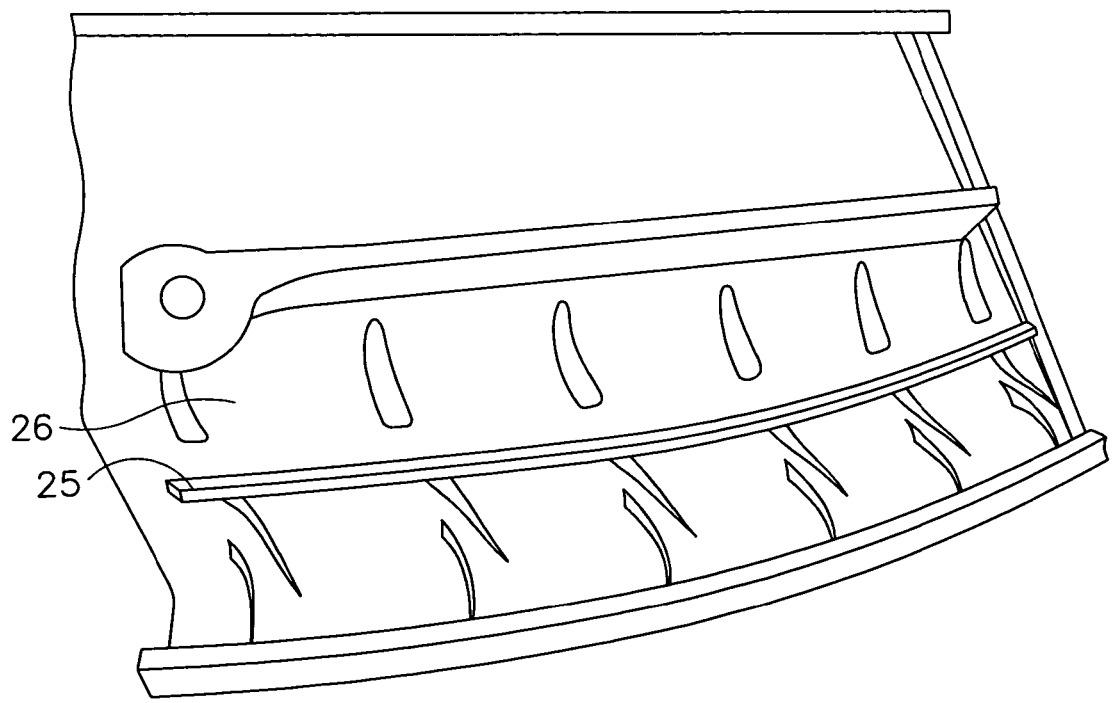
FIG. 3 illustrates a top perspective view of the plenum casting of the assembly of FIG. 1 following removal of the existing plenum cover in accordance with the present invention.

In FIG. 2, the existing outer plenum cover 30 has been damaged, and has partially collapsed. Collapse of the cover 30 is typically due to thermal and mechanical stress over an extended operating period in a gas turbine engine assembly, but can also be due to manufacturing defects. In any case, the collapse of the cover 30 compromises the volume of the plenum chamber 28, thereby impeding proper cooling air flow through the assembly 20. Replacement of the cover 30 only presents a very cost-efficient solution, so long as the other components of the assembly 20 are still within service specifications. An exemplary assembly 20 with the damaged cover 30 removed is shown in FIG. 3. The cover 30 can now be replaced with the repair cover 34, as further described herein.

Figure 4:
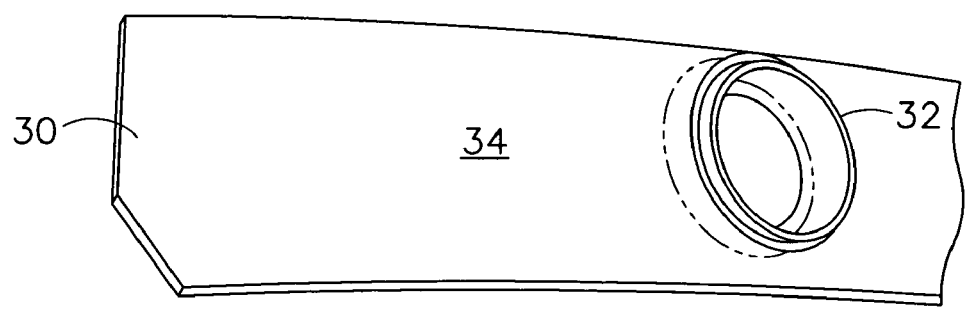
FIG. 4 is a repair plenum cover in accordance with the present invention.

As shown in greater detail in FIG. 4, the repair plenum cover 34 includes a body portion 35 and a spoolie boss 32. Body 35 provides a seal for the repair plenum cover 34 with the plenum casting 25 of the outer housing 26 to form a plenum chamber 28, and spoolie boss 32 permits airflow from the compressor into the plenum chamber 28.

Figure 5:
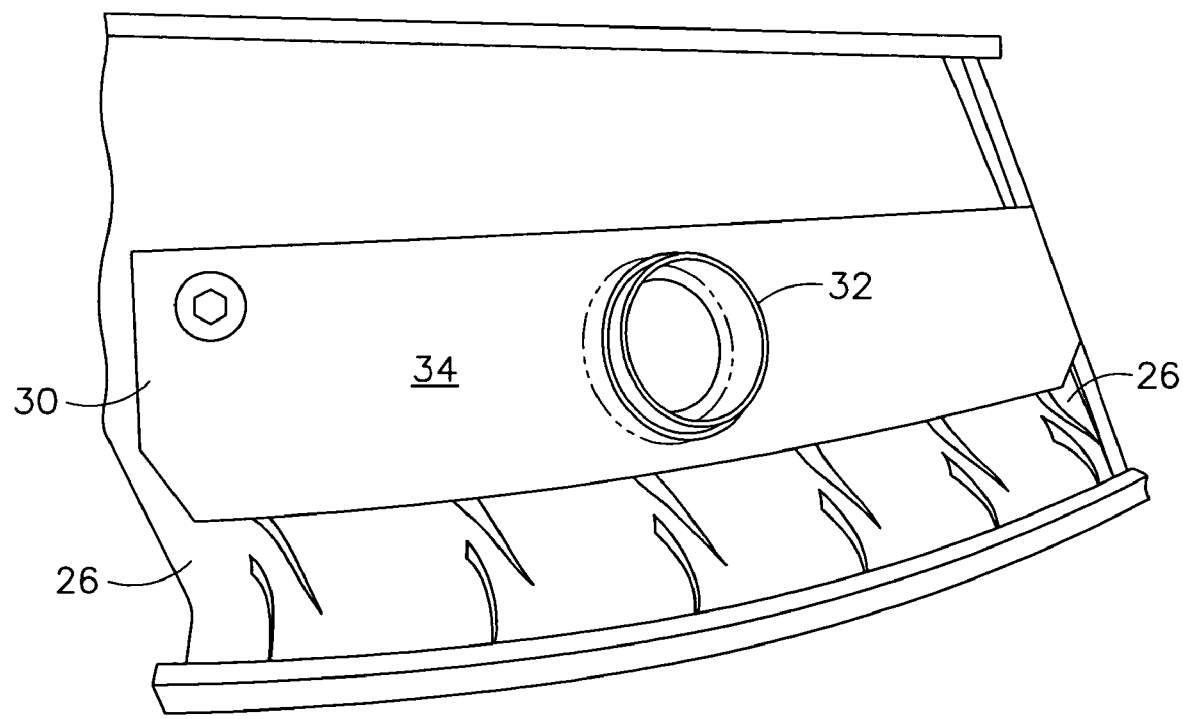
FIG. 5 illustrates the repair plenum cover of FIG. 4 attached to the plenum casting of FIG. 3.
Figure 6:
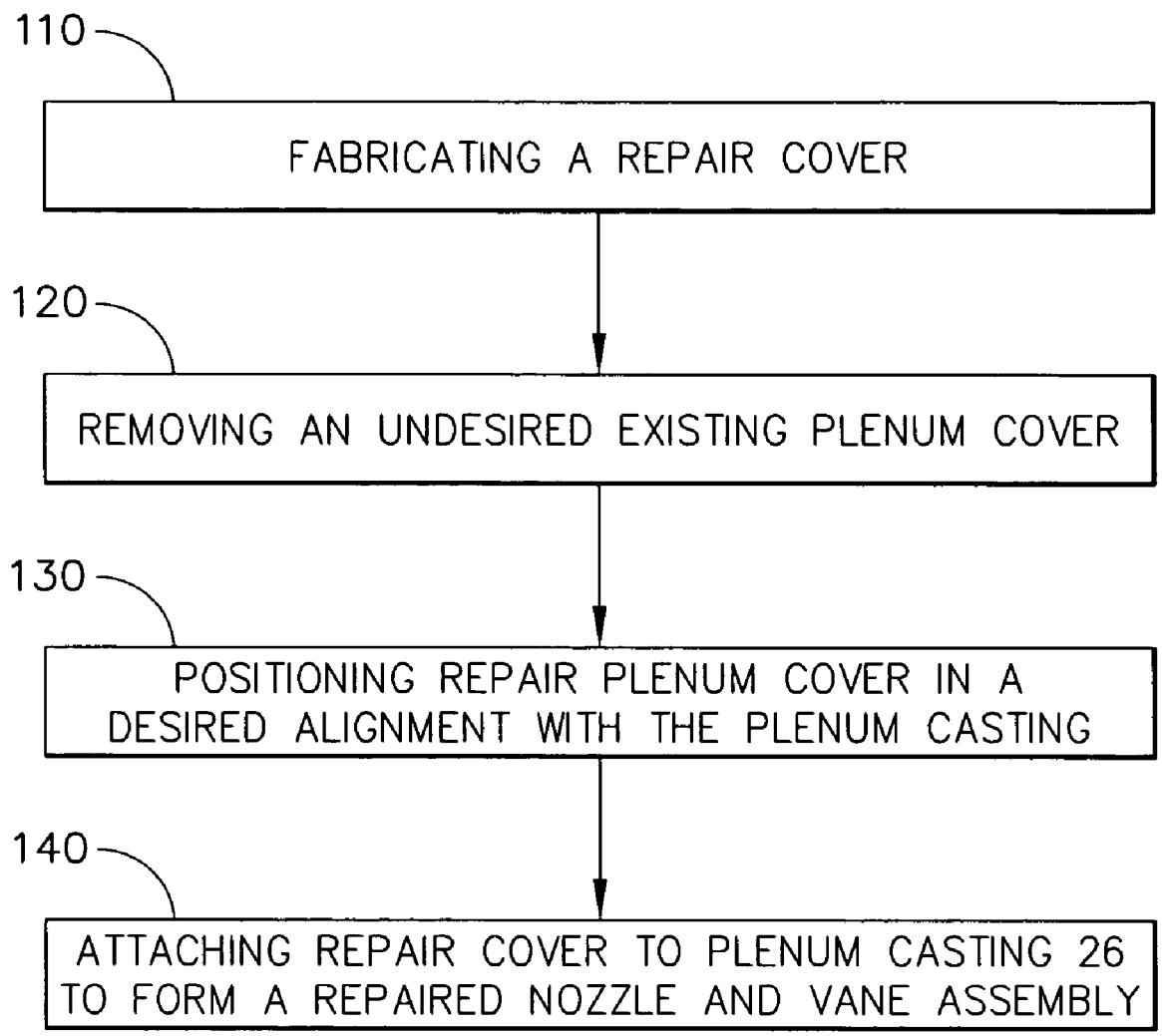
FIG. 6 illustrates a flow chart of one embodiment of the method of the present invention.

As shown in detail in FIG. 6, in one embodiment, the method of repairing a gas turbine plenum comprises the steps of: in step 110, fabricating a repair plenum cover 34, wherein the repair cover 34 (shown in FIG. 5) is fabricated from a sheet material and includes an attached spoolie boss 32, wherein the spoolie boss 32 is adapted to permit the passage of a cooling gas into a plenum chamber 28 formed by attachment of the cover 34 to an outer plenum casting 26; in step 120, removing an undesired existing plenum cover 30 from a nozzle and vane assembly 20, wherein the undesired existing cover 30 is adapted to direct the flow of the cooling gas to a plurality of vane openings; in step 130, positioning the repair plenum cover 34 in contact with and in a desired alignment with the plenum casting 26 of the nozzle and vane assembly; and in step 140, attaching the repair cover 34 to the plenum casting 25 of the outer housing 26 to form a repaired nozzle and vane assembly meeting predetermined specifications.

As shown in FIGS. 4-5, the repair cover 34 is provided as a SPAD having predetermined specifications and features suitable for forming a repaired nozzle and vane assembly. Preferably, the repair plenum cover 34 includes a spoolie boss 32 and plenum cover body portion 35 comprising a high-temperature metal or alloy that can endure the environmental demands of operating in the flowpath of a gas turbine engine assembly. The high-temperature material is preferably a nickel-based superalloy, cobalt-based superalloy, and combinations thereof. Preferably, the high-temperature alloy comprises RENE' 77 or RENE' 80. RENE™ is a trademark of General Electric Company, Fairfield, Conn. for superalloy metals having nominal compositions as indicated in Table 2 below. Other suitable high-temperature alloys are also shown in Table 1.

TABLE 1

| Material | | | | | | | | | | | | | | | | | | |
|---|---|---|---|---|---|---|---|---|---|---|---|---|---|---|---|---|---|---|
|  | C | Mn | Si | Cr | Fe | B | Zr | Ni | Co | Al | Ti | Mo | W | Others | V | Hf | Ta | Re | Misc. |
| MA734 | 0.05 | — | — | 20.0 | — | — | — | Bal | — | 0.3 | 0.5 | — | — | — | — | — | — | — | 2.5 |
| MA754 | 0.11 | — | — | 8.9 | — | 0.015 | 0.05 | Bal | 10 | 4.75 | 2.5 | 2 | 7 | Ta 3.8; Hf 1.5 | | | | | |
| Rene' 80H | 0.17 | — | — | 14 | 0.2 | 0.015 | 0.013 | Bal | 9.5 | 3 | 4.8 | 4 | 4 | Hf 0.75 | — | — | — | — | |
| Rene' 108 | 0.08 | 0.1 | — | 8.4 | — | 0.015 | — | Bal | 9.5 | 5.5 | 0.7 | 0.5 | 9.5 | Ta 3.1; Hf 1.5 | | | | | |
| Rene' 125 | 0.11 | — | — | 8.9 | — | 0.015 | 0.05 | Bal | 10 | 4.75 | 2.5 | 2 | 7 | Ta 3.8; Hf 1.5 | — | 1.55 | 3.8 | — | — |
| Rene' 142 | 0.12 | 0.1 | — | 6.8 | 0.2 | 0.015 | — | Bal | 12 | 6.15 | — | 1.5 | 4.9 | Ta 6.35; Hf 1.5; Re 2.8 | — | — | — | — | — |
| Rene' N4 | 0.06 | — | — | 9.75 | — | 0.004 | 0.02 | Bal | 7.5 | 4.2 | 3.5 | 1.5 | 6 | Ta 4.8; Hf 0.15 | — | — | — | — | — |
| Rene' N5 | 0.05 | — | — | 7 | — | 0.004 | — | Bal | 7.5 | 6.2 | — | 1.5 | 5 | Ta 6.5; Re 3; Hf 0.15 | — | — | — | — | — |
| Rene' 80 | 0.17 | 0.2 | 0.2 | 14 | 0.2 | 0.005 | 0.03 | Bal | 9.5 | 3 | 5 | 4 | 4 | — | — | — | — | — | — |
| Rene' 77 | 0.07 | 0.15 | 0.2 | 14.2 | 0.5 | 0.016 | 0.04 | Bal | 15 | 4.3 | 3.4 | 4.2 | — | — | — | — | — | — | — |
| Mar-M-509 | 0.06 | 0.1 | 0.4 | 22.5 | 1.5 | 0.01 | 0.5 | 10 | Bal | — | — | — | 7 | Ta 3.5 | — | — | — | — | — |
| X40 | 0.5 | 1 | 1 | 25 | 2 | — | — | 10.5 | Bal | — | — | — | 7.5 | — | — | — | — | — | — |
| HS188 | 0.1 | 1.25 | 0.4 | 22 | 3.5 | — | — | 22 | Bal | — | — | — | 15.5 | — | — | — | — | — | — |
| L605 | 0.1 | 1.5 | 1 | | | | | | | | | | | | | | | | |
| Hastelloy X | 0.1 | 1 | 1 | | | | | | | | | | | | | | | | |
| Inconel 625 | 0.1 | 0.5 | 0.5 | | | | | | | | | | | | | | | | |
| Inconel 600 | 0.15 | 1 | 0.5 | | | | | | | | | | | | | | | | |

TABLE 1-continued

| | Material | | | | | | | | | | | | | | | | | |
|---|---|---|---|---|---|---|---|---|---|---|---|---|---|---|---|---|---|---|
| | C | Mn | Si | Cr | Fe | B | Zr | Ni | Co | Al | Ti | Mo | W | Others | V | Hf | Ta | Re | Misc. |
| Inconel 718(C) | 0.05 | 0.35 | 0.35 | 19 | bar-ium. | 0.006 | — | 52.5 | — | 0.5 | 0.9 | 3 | — | Nb + Ta = 4.9 | — | — | — | — | — |
| 17-4PH (C) | 0.05 | 0.6 | 0.7 | 17 | Bal | — | — | 4 | — | — | — | — | — | Cu = 3.1 | — | — | — | — | — |
| Ti 6-4 (C) | — | — | — | — | — | — | — | — | — | 6 | Bal | — | — | Va = 4 | — | — | — | — | — |
| Rene' 220C | 0.03 | 0.05 | 0.1 | 19 | 0.5 | 0.004 | 0.01 | Bal | 12 | 0.5 | 1 | 3.2 | — | Nb 5.3; Ta 3.3 | — | — | — | — | — |
| GTD 222 | 0.1 | 0.1 | 0.25 | 22.5 | 0.35 | 0.004 | 0.013 | Bal | 19 | 1.2 | 2.3 | 0.15 | 2 | Ta 1 | — | — | — | — | — |
| Rene' 95 | 0.15 | 0.15 | 0.2 | 14 | — | 0.01 | 0.05 | Bal | 8 | 3.5 | 2.5 | 3.5 | 3.5 | Nb 3.5 | — | — | — | — | — |
| Rene' 88DT | — | — | | | | | | | | | | | | | | | | | |
| Inconel 718 | 0.05 | 0.35 | 0.35 | 19 | Bal | 0.006 | — | 52.5 | — | 0.5 | 0.9 | 3 | — | Nb + Ta = 4.9 | — | — | — | — | — |
| Direct Age 718 | 0.05 | 0.35 | 0.35 | 19 | Bal | 0.006 | — | 52.5 | — | 0.5 | 0.9 | 3 | — | Nb + Ta = 4.9 | — | — | — | — | — |
| Hi Strength 718 | 0.05 | 0.35 | 0.35 | 19 | Bal | 0.006 | — | 52.5 | — | 0.5 | 0.9 | 3 | — | Nb + Ta = 4.9 | — | — | — | — | — |
| Ti 17 | — | — | — | — | — | — | 2 | — | — | 5 | Bal | 4 | — | Sn 2 | — | — | — | — | — |
| Ti 6-4 | — | — | — | — | — | — | — | — | — | 6 | Bal | — | — | V 4 | — | — | — | — | — |
| Ti 8-1-1 | — | — | — | — | — | — | — | — | — | 8 | Bal | 1 | — | V 1 | — | — | — | — | — |
| Ti 6-2-4-2 | — | — | — | — | — | — | 4 | — | — | 6 | Bal | 2 | — | Sn 2 | — | — | — | — | — |

More preferably, the high temperature alloy is HASTELLOY X. HASTELLOY™ is a trademark for alloy metals owned by HAYNES INTERNATIONAL, INC. CORPORATION, KOKOMO Ind. 46904-9013. HASTELLOY X is assigned UNS No. N06002, and is also assigned the following ASM numbers: AMS 5798, AMS 5799, AMS 5888, AMS 5536, AMS 5588, AMS 5754. HASTELLOY X material is recommended especially for use in high-temperature applications because it has unusual resistance to oxidizing, reducing, and neutral atmospheres. For example, furnace rolls made of this alloy were still in good condition after operating for 8,700 hours at 2150° F. (1177° C.). HASTELLOY X also has performed well in jet engine tailpipes, afterburner components, cabin heaters, and other aircraft parts. HASTELLOY X is a nickel base alloy that possesses exceptional strength and oxidation resistance up to 2200° F. It has also been found to be exceptionally resistance to stress-corrosion cracking in petrochemical applications. The alloy has excellent forming and welding characteristics. HASTELLOY X can be forged and, because of its good ductility, can be cold-worked. It can be welded by both manual and automatic welding methods including shielded metal-arc (coated electrodes), gas tungsten-arc (TIG), and gas metal-arc (MIG). HASTELLOY X can also be resistance-welded. HASTELLOY X is further characterized as follows in Table 2 below:

TABLE 2

| Element | Min | Max |
|---|---|---|
| Molybdenum | 8.00 | 10.0 |
| Chromium | 20.5 | 23.0 |
| Iron | 17.0 | 20.0 |
| Tungsten | 0.20 | 1.00 |
| Cobalt | 0.50 | 2.50 |
| Carbon | 0.05 | 0.015 |
| Silicon | — | 1.00 |
| Manganese | — | 1.00 |
| Boron | — | 0.01 |
| Phosphorus | — | 0.04 |
| Sulfur | — | 0.03 |
| Nickel | | Balance |

In addition to manual attachment methods for initially connecting the repair cover 34 to the spoolie boss 32 and the plenum casting 25 of the housing 26, a brazing repair material is used to attach the spoolie boss 32 to the body 35 of the repair cover 34, and the repair cover 34 to the housing 26, is preferably a braze material that is selected to be compatible with the material of the repair cover 34 and the spoolie boss 32. The brazing material can be provided in the form of wire, rod, strip, foil, powder, and/or a viscous mixture (paste) including powder in a suitable binder. Where the housing 26, cover 34 and/or spoolie boss 32 are comprised of stainless steel, the repair material is preferably a nickel alloy brazing material. More preferably, the repair cover 34 and spoolie boss 32 are made of 310 stainless steel or 410 stainless steel, and the brazing material is a nickel alloy brazing filler. Most preferably, the brazing filler is comprised of about 4.5% Si, 7.0% Cr 3.1% B, 3.0% Fe, balance Ni, and characterized by a solidus-liquidus range of between about 1780 to about 1830° F. (about 971 to about 999° C.). An exemplary nickel alloy brazing material having these properties is SAE AMS4777F, as specified, described and published by the Society of Automotive Engineers, Inc. of Warrendale, Penn., USA. However, other nickel alloy brazing materials can be utilized. In this embodiment, the preferred nickel alloy brazing material is capable of joining nonferrous alloys and corrosion and heat resistant steels and alloys, and displays low flow point and corrosion and produces oxidation resistant joints with good strength at elevated temperatures. A further benefit of the preferred nickel alloy brazing material is that it provides a corrosion and oxidation resistant hard coating that can be smoothed and otherwise worked to yield a smooth repair area on turbine engine components that are routinely exposed to high operating temperatures. Because the braze material includes Boron, an element that diffuses very rapidly, and Si, an element that diffuses quickly (but not as quickly as Boron), these elements, which contribute to the solidus temperature of the braze material being lower than the materials being joined, will rapidly diffuse from the braze material upon high temperature exposure, thereby raising the solidus temperature of the braze material.

Alternatively, where the material comprising the housing 26, repair cover 34 and/or spoolie boss 32 is an alloy, such as an iron-based superalloy, cobalt-based superalloy or a nickel-based superalloy, an appropriate repair material can be selected according to the alloy material. Appropriate braze materials and methods for such alloys are disclosed in commonly owned U.S. Pat. No. 6,464,128, which is hereby incorporated by reference in its entirety. For example, in one embodiment, the repair material is a braze material comprising a powder of a first alloy component and a powder of a second alloy component, each component having different solidus temperatures. The repair material that is later formed as a melted mixture of the first powder and the second powder has a solidus temperature less than that of a shroud material that forms a repair region on the assembly 20, such as the joinder between the repair cover 34 and spoolie boss 32, and the repair cover 34 and the plenum casting 25 and outer housing 26.

The repair material powders selected for use with cobalt-base replacement elements 34, 32 and the housing 26 materials are different from those selected for nickel-base assemblies 20 and elements 34, 32. In one embodiment, the sheet material of the repair cover 34 is a cobalt-base alloy known as Mar M509, which has a nominal composition, in weight percent, comprising about 23.5 percent chromium, about 10 weight percent nickel, about 7 percent tungsten, about 3.5 percent tantalum, about 0.2 percent titanium, about 0.4 percent zirconium, about 0.6 percent carbon, no more than about 2 percent iron, the balance cobalt and impurities. Additionally, in this embodiment, the braze repair material can include melt-depressants such as Boron and Silicon.

Preferably, for cobalt-base housing 26 and repair elements 34, 32, the first alloy component of the repair material preferably comprises a prealloyed composition, in weight percent, of from about 10 to about 25 percent nickel, from about 15 to about 25 percent chromium, from about 5 to about 10 percent silicon, from about 2 to about 6 percent tungsten, from about 0.2 to about 0.8 percent carbon, from about 0.4 to about 2.0 percent boron, balance cobalt and impurities. The second alloy component preferably comprises a prealloyed composition, in weight percent of from about 5 to about 15 percent nickel, from about 15 to about 30 percent chromium, about 2.0 percent maximum silicon, from about 5 to about 10 percent tungsten, from about 0.3 to about 0.8 percent carbon, about 1.5 percent maximum manganese, about 3 percent maximum iron, about 0.5 percent maximum zirconium, balance cobalt and impurities. The first fraction is preferably from about 25 weight percent to about 50 weight percent, most preferably about 35 weight percent. The second fraction is preferably from about 75 weight percent to about 50 weight percent, most preferably about 65 weight percent.

In another embodiment, the housing 26, repair cover 34 and/or spoolie boss 32 can comprise a nickel-base superalloy such as Rene N5, which has a nominal composition, in weight percent, of from about 6 to about 6.4 percent aluminum, from about 6.75 to about 7.25 percent chromium, from about 7 to about 8 percent cobalt, from about 0.12 to about 0.18 percent hafnium, from about 1.3 to about 1.7 percent molybdenum, from about 2.75 to about 3.25 percent rhenium, from about 6.3 to about 6.7 percent tantalum, from about 4.75 to about 5.25 percent tungsten, a sum of aluminum plus tantalum about 12.45 percent minimum, balance nickel and impurities. Where the assembly 20 material is a nickel-base superalloy such as Rene N5, the first alloy component preferably comprises a prealloyed composition, in weight percent, of from about 10 to about 20 percent cobalt, from about 14 to about 25 percent chromium, from about 2 to about 12 percent aluminum, from 0 to about 0.2 percent yttrium, balance nickel and impurities. The second alloy component preferably comprises a prealloyed composition, in weight percent of from about 10 to about 20 percent cobalt, from about 14 to about 25 percent chromium, from about 2 to about 12 percent aluminum, from about 2 to about 12 percent silicon, balance nickel and impurities. The first fraction is preferably from about 55 to about 80 weight percent, most preferably about 68.5 weight percent. The second fraction is preferably from about 45 weight percent to about 20 weight percent, most preferably about 31.5 weight percent.

Where the braze repair material is comprised of two types of individually prealloyed powders, the powders may be provided in a loose, free-flowing form. Alternatively, they may instead be provided as an unsintered compact or a pre-sintered compact. Both approaches are operable, although the use of the pre-sintered compact can be more practical for production operations. In this latter approach, the powders are mixed together, pressed with a binder into a desired shape before applying to the repair region. Optionally, to form a pre-sintered compact, the mixed powders can be pre-sintered by heating to a temperature where the powders are slightly sintered together to form a compact. It is not necessary that either compact have a high relative density (that is, little porosity), as it is later fully melted. The compacts are more easily handled and positioned than are the free-flowing powders, and there is less compaction and shrinkage in subsequent melting. A combination of these approaches may be desired.

The braze repair material is placed into the repair region adjacent the elements 25, 32, 34 to be joined. The repair material may be the mixture of the free-flowing powders, the compact, or a combination of both. The amount of braze repair material is preferably selected so that, after subsequent melting and machining, the repair regions are restored to approximate a predetermined desired service dimension. However, machining can be performed as an additional step to impart and restore desired dimensions of the original nozzle and vane assembly 20.

To attach the spoolie boss 32 to the repair cover 34, the spoolie boss 32 is placed through a hole provided in the repair cover 34. Manual attachment methods such as GTAW are used to position the spoolie boss 32 on the cover 34. A braze repair material is next placed in the repair region formed by the touching surfaces of the cover 34 and spoolie boss 32. The repair material is next heated to a brazing temperature to melt at least a portion of the repair material but not the cover 34 material or the spoolie boss 32. The braze repair material should always be selected so that its melting temperature is below both that of the material of the repair spoolie boss 32 and the repair cover 34. In the case of the above-discussed preferred repair material for stainless steel components 32, 34 and the indicated brazing repair material R15/D80, the brazing temperature is between about 1780° F. to about 1830° F. However, the brazing temperature can be varied between about 1400 and about 2200° F. based on parameters of the particular repair, including material, mass, configuration, and application. Where the elements 32, 34, are comprised of cobalt-base alloys or the nickel-base alloys, the brazing temperature is from about 2190° F. to about 2335° F., and preferably from about 2300° F. to about 2325° F. However, the brazing temperature range can be further varied based on parameters of the particular repair, including mass, configuration, and application. In embodiments wherein the repair material includes two alloy powders, at the brazing temperature, the powder having the lower solidus temperature melts to accelerate the bonding and the densification process, while the powder having the higher solidus temperature remains substantially solid so that the powder mass generally retains its shape.

The brazing is preferably performed in a vacuum furnace. The brazing time, defined as the period of time at which the repair region is maintained at a temperature sufficient to braze the repair material, can also be varied based on parameters of the particular repair, including material, mass, configuration, and application. For example, the brazing time is typically on the order of about 20 minutes to about 2 hours. More preferably, the brazing time is between about 1 hour to about 2 hours. After brazing, the repaired assembly is braze cooled to solidify the repair material. The braze repair material solidifies, forming a metallurgical bond between the connected elements 32, 34. The result is a repair cover 34 suitable for permanently affixing to the plenum casting 25.

Attachment to the plenum casting is performed using the same attachment and brazing methods described for attaching the spoolie boss 32 to the repair cover 34, taking into account the composition of the casting 25 and the repair cover 34. Additionally, in most cases, the amount of braze repair material is selected so that the repair region will be slightly oversize after the brazing and cooling steps. Although it would be desirable to make the repair exactly the right size after brazing and cooling, it is typically not possible to control the amount and distribution of the repair metal that precisely. Accordingly, the repair region can be made oversize, and then excess material machined away to achieve the correct size and with the necessary details to restore the repair region to operating tolerances.

EXAMPLES

The invention has been applied to repair of CF6 stage 1 LPT vanes in General Electric CF6-80C2 and CF6-80E nozzles. In those models, 22 plenum covers are provided in each LPT nozzle and vane assembly, with 2 spoolies and 2 covers per nozzle—an inner cover and an outer cover 30. In this embodiment, a spoolie boss 32 receiver cup comprising HASTELLOY X alloy was attached to the sheet material comprising HASTELLOY X using the Activated Diffusion Healing ("ADH") method of brazing, at approximately 2210° F. using R80/D15 alloy brazing material to form a repair cover 30. R80/D15 is a 50/50 mixture by weight of Rene '80 (GE Spec. B50TF183-C1.A) and Braze Alloy D15 (GE Spec. B50TF173-C1.A), and is available from Sulzer Metco, Inc. of Westbury, N.Y. 11590. The resulting assembly was attached to a RENE '77 plenum casting 25 using welding and the ADH method at 2210° F. using R80/D15 alloy brazing material. The composition of R80 and D15, respectively, used in this Example are as follows:

GE Spec. B50TF173, D-15 Brazing And Activated Diffusion Bonding Alloy Nickel Base (by Chemical Composition and Weight Percent).

| Carbon | 0.05 Max. | Molybdenum | 0.05 Max. |
|---|---|---|---|
| Manganese | 0.10 Max. | Tungsten | 0.05 Max. |
| Sulfur | 0.01 Max. | Iron | 0.5 Max. |
| Chromium | 14.8-15.8 | Boron | 2.1-2.5 |
| Cobalt | 9.5-11.0 | Zirconium | 0.05 Max. |
| Titanium | 0.05 Max. | Selenium | 0.005 Max. |
| Tantalum | 3.0-3.8 | Oxygen | 0.03 Max. |
| Aluminum | 3.2-3.7 | Nitrogen | 0.03 Max. |
| Total Other Impurities | 0.1 Max. | | |

GE Spec. B50TF183, RENE'80 ALLOY POWDER (by Chemical Composition and Weight Percent).

| Carbon | 0.15-0.19 | Cobalt | 9.00-10.00 |
|---|---|---|---|
| Manganese | 0.10 Max. | Zirconium | 0.03-0.10 |
| Silicon | 0.10 Max. | Iron | 0.35 Max. |
| Sulfur | 0.0075 Max. | Niobium | 0.10 Max. |
| Phosphorus | 0.015 Max. | Tantalum | 0.10 Max. |
| Chromium | 13.70-14.30 | Vanadium | 0.10 Max. |
| Titanium | 4.80-5.20 | Copper | 0.10 Max. |
| Boron | 0.01-0.02 | Hafnium | 0.10 Max. |
| Aluminum | 2.80-3.20 | Magnesium | 0.01 Max. |
| Tungsten | 3.70-4.30 | Oxygen | 0.0300 Max (1) |
| Molybdenum | 3.70-4.30 | Nitrogen | 0.0300 Max. (1) |
| Tungsten + Molybdenum | 7.70 Min. | Nickel | Remainder |
| | | Nv3 | 2.32 Max. |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of repairing a gas turbine vane and nozzle assembly, the method comprising the steps of:
    fabricating a repair cover, wherein the step of fabricating the repair cover comprises the steps of:
        providing an alloy sheet material;
        machining a hole through the alloy sheet material for receiving a spoolie boss;
        providing a spoolie boss;
        inserting the spoolie boss into the machined hole; and
        attaching the spoolie boss securely to the sheet material surrounding the machined hole so that the spoolie boss is adapted to permit the passage of a cooling gas into a plenum chamber for conveyance to a plurality of cooling openings in at least one vane when the repair cover is attached to a vane and nozzle assembly;
    removing an undesired plenum cover from the plenum casting of a vane and nozzle assembly, wherein the undesired plenum cover is adapted to direct the flow of the cooling gas into a plenum chamber for conveyance to a plurality of cooling openings in the at least one vane;
    positioning the repair cover over a plenum casting of the vane and nozzle assembly, the repair cover in a desired alignment with the vane assembly; and
    attaching the repair cover to the plenum casting of the vane and nozzle assembly to form a repaired nozzle and vane assembly having a plenum chamber for conveyance of cooling gas to a plurality of cooling openings in the at least one vane.

2. The method of claim 1, wherein the sheet material and the spoolie boss are comprised of a high-temperature alloy selected from the group consisting of iron-based superalloys, nickel-based superalloys, cobalt-based superalloys, and combinations thereof.

3. The method of claim 2, wherein the sheet material and the spoolie boss are comprised of an identical high-temperature alloy.

4. The method of claim 2, wherein the high-temperature alloy is comprised of between about 8 to about 10 weight percent Molybdenum, between about 20 percent to about 23 percent Chromium, between about 17 to about 20 weight percent Iron, between about 0.2 to about 1.0 weight percent Tungsten, between about 0.5 to about 2.5 weight percent Carbon, between 0 and about 1.0 weight percent Silicon, between 0 to about 1.0 weight percent Manganese, between 0 to about 1.0 weight percent Boron, between 0 to about 0.04 weight percent Phospohorus, between 0 to about 0.03 weight percent Sulfur, the balance Nickel.

5. The method of claim 1, wherein the step of attaching the spoolie boss to the sheet material comprises providing a brazing material, contacting the brazing material to the sheet material and the spoolie boss, and heating the brazing material to a temperature sufficient to reach the liquidus-solidus temperature of the brazing material.

6. The method of claim 5, wherein the step of attaching the spoolie boss to the sheet material comprises brazing using an activated diffusion healing method of brazing.

7. The method of claim 6, wherein spoolie boss and sheet material are both comprised of a cobalt-nickel alloy, wherein the brazing material is R80/D15, and wherein the brazing is performed at about 2210 degrees Fahrenheit.

8. The method of claim 1, further comprising the step of machining a borescope hole through the sheet material prior to attachment of the spoolie boss.

9. The method of claim 1, further comprising the step of machining a borescope hole through the sheet material after attachment of the spoolie boss.

10. A pre-fabricated repair cover for repairing a nozzle and vane assembly previously in service in a gas turbine engine, the repair cover comprising:
an alloy sheet material,
a spoolie boss attached to the sheet material by braze material, the spoolie boss adapted to permit passage of a cooling gas into a plenum chamber of a nozzle and vane assembly for cooling of at least one vane of the nozzle and vane assembly.

11. The repair cover of claim 10, wherein the spoolie boss is attached using braze material selected from the group consisting of: wire, rod, strip, foli, powder, viscous mixtures of powder allow and binder, free flowing prealloyed powders, unsintered compacts, and pre-sintered compacts.

12. The repair cover of claim 11, wherein the sheet material and the spoolie boss are comprised of a high-temperature alloy selected from the group consisting of iron-based superalloys, nickel-based superalloys, cobalt-based superalloys, and combinations thereof.

13. The repair cover of claim 12, wherein the repair cover and the spoolie boss are comprised of an identical high-temperature alloy material.

14. The repair cover of claim 13, wherein the high-temperature alloy is comprised of between about 8 to about 10 weight percent Molybdenum, between about 20 percent to about 23 percent Chromium, between about 17 to about 20 weight percent Iron, between about 0.2 to about 1.0 weight percent Tungsten, between about 0.5 to about 2.5 weight percent Carbon, between 0 and about 1.0 weight percent Silicon, between 0 to about 1.0 weight percent Manganese, between 0 to about 1.0 weight percent Boron, between 0 to about 0.04 weight percent Phospohorus, between 0 to about 0.03 weight percent Sulfur, the balance Nickel.

15. The repair cover of claim 14, wherein the spoolie boss is attached to the sheet material by braze material selected from the group consisting of: re-sintered compacts of pre-alloyed powders; and unsintered compacts of prealloyed powders.

16. The repair cover of claim 10, wherein the repair cover further includes a borescope hole adapted to permit insertion of a borescope or other diagnostic tool through the repair cover to permit inspection of the vane and nozzle assembly after attachment of the repair cover to the assembly.

17. A repaired nozzle and vane assembly for a gas turbine engine, the repaired nozzle and vane assembly comprising:
an alloy sheet material
a spoolie boss attached to the sheet material by braze material to form a repair cover adapted to permit the passage of a cooling gas into a plenum chamber of a nozzle and vane assembly; and
a plenum casting attached to the repair cover to form a repaired nozzle and vane assembly for a gas turbine engine.

18. The repaired nozzle and vane assembly of claim 17, wherein the sheet material and the spoolie boss are comprised of a high-temperature alloy selected from the group consisting of iron-based superalloys, nickel-based superalloys, cobalt-based superalloys, and combinations thereof.

19. The repaired nozzle and vane assembly of claim 18, wherein the high-temperature alloy is comprised of between about 8 to about 10 weight percent Molybdenum, between about 20 percent to about 23 percent Chromium, between about 17 to about 20 weight percent Iron, between about 0.2 to about 1.0 weight percent Tungsten, between about 0.5 to about 2.5 weight percent Carbon, between 0 and about 1.0 weight percent Silicon, between 0 to about 1.0 weight percent Manganese, between 0 to about 1.0 weight percent Boron, between 0 to about 0.04 weight percent Phospohorus, between 0 to about 0.03 weight percent Sulfur, the balance Nickel.

20. The repaired nozzle and vane assembly of claim 18, wherein the repair cover further includes a borescope hole adapted to permit insertion of a borescope or other diagnostic tool through the repair cover to permit inspection of the plenum chamber of the vane and nozzle assembly.

* * * * *